C. C. BRANDT & J. C. SHILLOOK.

Improvement in Hay-Rakers and Loaders.

No. 128,012.          Patented June 18, 1872.

WITNESSES.
Geo. E. Upham.
D. D. Kane

INVENTORS.
Charles C. Brandt,
John C. Shillook,
Chipman Hosmer & Co.
Attys.

UNITED STATES PATENT OFFICE.

CHARLES C. BRANDT AND JOHN C. SHILLOOK, OF NEW ULM, MINNESOTA.

IMPROVEMENT IN HAY RAKERS AND LOADERS.

Specification forming part of Letters Patent No. 128,012, dated June 18, 1872.

*To all whom it may concern:*

Be it known that we, CHARLES C. BRANDT and JOHN C. SHILLOOK, of New Ulm, in the county of Brown and State of Minnesota, have invented a new and valuable Improvement in Hay Loading and Raking Apparatus; and we do hereby declare that the following is a full, clear, and exact description of the construction and operation of the same, reference being had to the annexed drawing making a part of this specification, and to the letters and figures of reference marked thereon.

Figure 1:
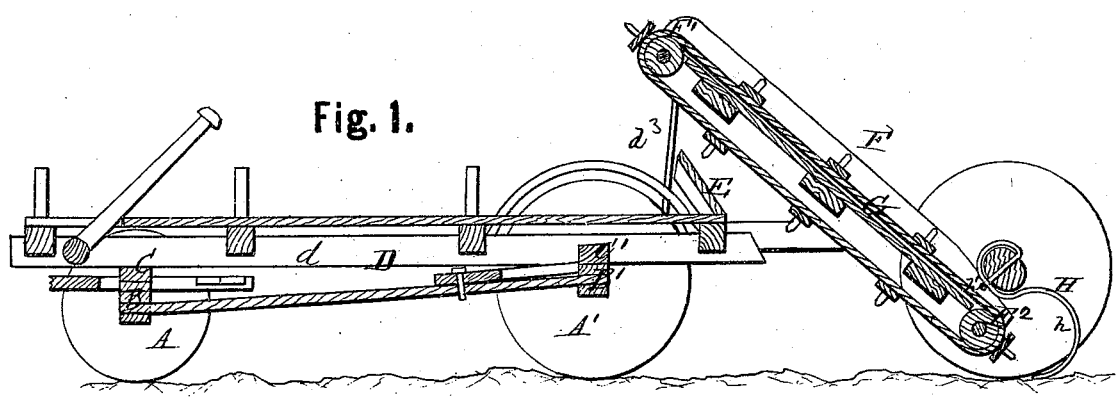
Figure 2:
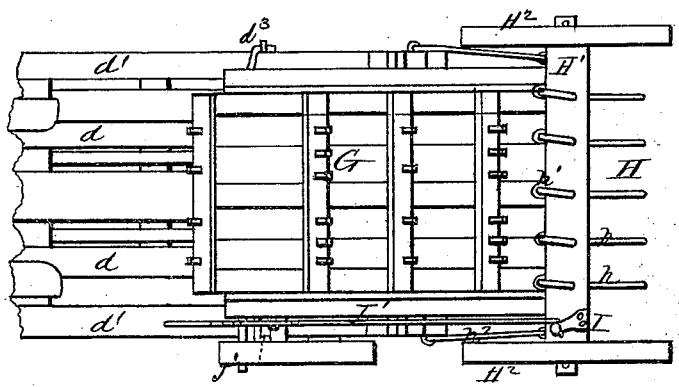
Figure 3:
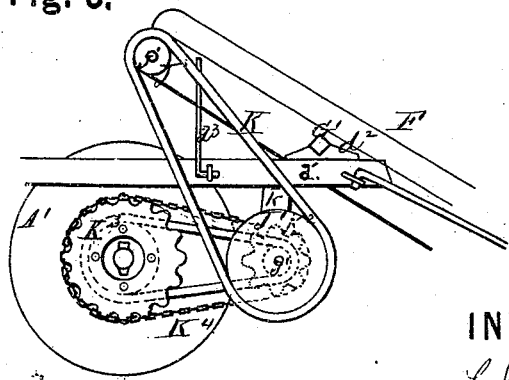

Figure 1 of the drawing is a representation of a longitudinal vertical section, Fig. 2 is a plan view, and Fig. 3 is a detail view, of our invention.

This invention has relation to hay raking and loading attachments for wagons; and consists in the construction and novel arrangement of a frame designed to be placed on the running-gear of a wagon, and adapted to hold the hay and to support the forward end of the hay-elevator.

The parts embraced in this invention may be applied to any ordinary farm-wagon when the body thereof is removed.

Referring to the accompanying drawing, A A' represent the wheels of a wagon; B B', the axles; C C', the bolsters. D designates a frame, somewhat the same as the frame of an ordinary hay-wagon. The horizontal bars $d$ of said frame are notched to fit the bolsters, on which they rest. The side bars $d^1$ project beyond the rear end of the wagon and hold blocks $d^2$, having angular notches. E designates an inclined board arranged at the rear end of the frame D, and intended to serve as a guard to prevent the hay from falling over the back of the wagon while being loaded. F designates an inclined rectangular frame, provided with rollers $F^1$ $F^2$, over which travels an endless apron, G, armed with studs for gathering the hay from a rake, H, and conveying it to the wagon. G' represents angular bars projecting from the sides of the frame F, and resting on the notched blocks $d^1$ in such a way as to support said frame. $d^3$ are rods arranged as hooks to connect the frame to the side bars $d^1$. The lower end of the frame F is attached to an axle, $H^1$, supported by two wheels, $H^2$. This axle is armed with the rake-teeth $h$, which are passed through it from the back, thence carried over the top, down underneath, and back into their proper positions, as shown. The shoulders of said teeth are kept apart from the axle so as to give the teeth elasticity. The teeth pass through loops $h^1$, which hold them in their proper places. Hooks $h^2$ connect the axle to the ends of the bars $d^1$. I represents a handle for elevating the rake from the ground. I' is a rod by means of which a person on the wagon may operate the handle. J designates a pulley on one end of the shaft $j$ of the roller $F^1$. J' is a pulley on the end of a shaft, $j'$, having its bearings in two standards, $k$, depending from the frame D. K represents a belt connecting said pulleys together. $K^2$ designates a chain-wheel on axle or shaft $j'$. $K^3$ is a larger chain-wheel attached to the face of one of the wheels A'. $K^4$ is a chain-band connecting the wheels $K^2$ $K^3$. By means of these devices for transmitting motive power and increasing speed the endless apron is operated when the wagon goes forward.

Instead of chains and chain-wheels, belts and pulleys may be used.

The hay loading and raking devices and operating mechanism may be removed and readjusted at pleasure.

What we claim as our invention, and desire to secure by Letters Patent, is—

The within-described hay loading and raking apparatus, consisting of the frame D having the extended side bars $d^1$ with notched blocks $d^2$, the elevator-frame F with endless apron G, the axle $H^1$ supported by wheels $H^2$ and having a handle, I, and rake-teeth $h$, the wheels $K^3$ $K^2$ J' J and bands K $K^4$, all constructed and arranged substantially as specified.

In testimony that we claim the above we have hereunto subscribed our names in the presence of two witnesses.

CHARLES C. BRANDT.
JOHN C. SHILLOOK.

Witnesses:
CHARLES SOMMER,
JOHN HEMENSTEIN.